(12) United States Patent
Gopfert et al.

(10) Patent No.: US 8,313,297 B2
(45) Date of Patent: Nov. 20, 2012

(54) ROTOR SHAFT FOR A WIND ENERGY PLANT AND WIND ENERGY PLANT

(75) Inventors: Ulf Gopfert, Rostock (DE); Uwe Kaiser, Rostock (DE)

(73) Assignee: Nordex Energy GmbH, Norderstedt (DE)

( * ) Notice: Subject to any disclaimer, the term of this patent is extended or adjusted under 35 U.S.C. 154(b) by 817 days.

(21) Appl. No.: 12/492,785

(22) Filed: Jun. 26, 2009

(65) Prior Publication Data
US 2010/0029399 A1      Feb. 4, 2010

(30) Foreign Application Priority Data

Jul. 29, 2008   (DE) .......................... 10 2008 035 339

(51) Int. Cl.
*F03D 9/00*         (2006.01)
(52) U.S. Cl. ................. 416/146 R; 416/155; 416/244 R
(58) Field of Classification Search .................... 416/26, 416/27, 30, 153, 154, 155, 244 R, 244 A; 415/216.1
See application file for complete search history.

(56) References Cited

U.S. PATENT DOCUMENTS
6,428,274 B1 *  8/2002  Hehenberger ................ 416/153

FOREIGN PATENT DOCUMENTS
WO        9923384        3/1999
* cited by examiner

*Primary Examiner* — Edward Look
*Assistant Examiner* — Aaron R Eastman
(74) *Attorney, Agent, or Firm* — Vidas, Arrett & Steinkraus, P.A.

(57) ABSTRACT

The invention is related to a rotor shaft for a wind energy plant, wherein the rotor shaft is at least partially hollow, comprising a line pipe, extending in the interior of the rotating rotor shaft and being stationary and accommodating electric lines, a transmission device, arranged at least partially in the rotor shaft, for the electric connection between a stationary nacelle and a rotating rotor of the wind energy plant, wherein the transmission device features a first body, stationary and connected to the line pipe, and a second body rotating with the rotor shaft, and wherein there is an electric sliding contact between the first and the second body, a casing surrounding the transmission device and formed separately from the second body, which is connected to the rotor shaft and/or adapted to be connected to a rotor hub of the wind energy plant, and which rotates with the rotor shaft, and a torque transmitting connection between the casing and the second body of the transmission device.

18 Claims, 1 Drawing Sheet

ROTOR SHAFT FOR A WIND ENERGY PLANT AND WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a rotor shaft for a wind energy plant, as well as to a wind energy plant. Wind energy plants with an electric blade angle control (pitch control) are often equipped with a slip ring system, which transmits electric energy and signals as a transmission device from the stationary electric system of the nacelle of the plant into the pitch system in the rotor hub assembly group that rotates with the rotor of the plant. For this purpose, known rotor shafts have a core bore, in which a stationary line pipe (also pitch pipe) extends. The line pipe has the objective to accommodate and protect the electric lines which are to be guided from the stationary nacelle into the rotating rotor hub. Usually, it begins behind the gearbox, where it is also mounted, and guides the lines from there up to the interior of the rotor hub. The line pipe is often mounted on the rotor shaft flange for the fastening of the rotor shaft on the rotor hub by way of a second bearing provided there. In this way, the rotor shaft rotates around the line pipe.

In the known rotor shafts, the line pipe ends in the interior of the rotor hub in a coupling, on which the transmission device is fastened, a slip ring body for instance. The lines guided through the line pipe end in a plug of the coupling, which in turn is connected to a socket of the transmission device. In this, the coupling takes up the inertial forces of the transmission device and guides them into the line pipe. Thus, the transmission device hangs freely in the inner space of the rotor hub. In the case of a slip ring system, the transmission device consists of a stationary inner part (inner ring) and a rotating outer part (outer ring), for instance. Electric energy and control signals are transmitted by way of sliding contacts between the stationary inner ring and the rotating outer ring. Via additional electric lines, which are fastened on the rotating outer ring, the electric energy and control signals are guided into the rotor hub, and there they can feed the pitch control device of the plant, for instance. Inner and outer ring are mounted by way of bearing arrangements. By way of a torque bracket, connected to the rotor shaft at the one side and to the outer ring at the other side, it is brought about that the outer ring rotates along with the rotor shaft.

In known wind energy plants, the transmission device is situated in the interior of the rotor hub, and through this it occupies significant space in the anyway limited inner space of the hub. This makes the work of operators in the inner hub space difficult. In particular, upon entrance into the rotor hub via additional rear entrance openings, an entering person inevitably steps on the transmission device. The same must be protected in a correspondingly sumptuous way. It must be expected that this problem will be aggravated in the future, because future wind energy plants will require greater blade pitch adjustment powers and an increased expense for sensor technology, so that even the dimensions of the transmission devices will increase.

It comes along that with known rotor shafts and wind energy plants, the transmission device can be installed only at the location of the wind energy plant, because otherwise it would be damaged in the transportation of the plant or of the drive train, respectively, or in the building of the plant. This leads to an increased expense for the installation. Besides, the transmission device must be brought into the rotor hub for the installation on location, which means a risk of damage. In addition, the utilisation of known constructions is difficult at rotor shafts formed hollow in a predominant part. Furthermore, the known constructions are sumptuous with respect to their installation and do not always offer sufficient protection for the individual components of the transmission device.

Starting from the discussed state of the art, the present invention is based on the objective to provide a rotor shaft and as well a wind energy plant of the kind mentioned in the beginning, which permits simple installation, simplifies the work in the inner space of the rotor hub and is also flexibly usable.

BRIEF SUMMARY OF THE INVENTION

According to a first aspect of the present invention, the objective is resolved by an at least partly hollow rotor shaft for a wind energy plant, comprising a line pipe, extending in the interior of the rotating rotor shaft and being stationary and accommodating electric lines, a transmission device, arranged at least partially in the rotor shaft, for the electric connection between a stationary nacelle and a rotating rotor of the wind energy plant, wherein the transmission device features a first body, stationary and connected to the line pipe, and a second body rotating with the rotor shaft, and wherein there is an electric sliding contact between the first and the second body, a casing surrounding the transmission device and formed separately from the second body, which is connected to the rotor shaft and/or adapted to be connected to a rotor hub of the wind energy plant, and which rotates with the rotor shaft, and a torque transmitting connection between the casing and the second body of the transmission device.

According to the present invention, the transmission device is thus at least partly arranged in the interior of the rotor shaft. Through this, installation of the transmission device is possible already in the factory, before the build-up of the plant on the respective location. The risk of damage in the course of transportation or build-up is therefore significantly decreased. At the same time, more space is provided for service operators in the inner space of the hub. Through this, simple permission of access to the inner space of the hub can be provided. The casing, almost completely surrounding the transmission device in this, safely protects the transmission device against damages or incrustations; let it be in the course of the transportation or in the subsequent operation. The first aspect of the present invention is particularly advantageous with rotor shafts that do not feature an additional flange for fastening a bearing for the line pipe. The casing forms an adapter construction, which permits simple installation of the transmission device in differently shaped rotor shafts. For instance, the transmission device can be used in particular with rotor shafts that are predominantly formed hollow in the region of their connection to the rotor hub of the wind energy plant.

According to one embodiment of the first aspect of the present invention, the casing can be fixed on a flange of the rotor shaft, which is provided for the fastening of the rotor shaft on the rotor hub. Through this, a particularly simple and at the same time safe construction is achieved. The casing may feature a flange for the fastening on the rotor shaft and/or on the rotor hub. Through this, even with rotor shafts formed predominantly hollow, a particularly simple installation is achieved.

The line pipe guides electric lines from the stationary nacelle into the transmission device. Via the electric sliding contact, a connection to the rotating second body of the transmission device is produced. Correspondingly, electric lines can start from the second body. For introducing these lines into the inner space of the rotor hub, the casing may have a line bushing.

The casing surrounds the transmission device completely. In order to make maintenance of the transmission device possible in a simple way in spite of this, a preferred embodiment provides that the casing features a detachable covering which faces the inner space of the rotor hub of the wind energy plant. This covering, for instance a cover-up plate, can be removed in a simple way if need be, in order to permit access to the transmission device.

According to a further embodiment, a bearing can be provided on the casing, by way of which the casing is mounted rotatably with respect to the line pipe. The line pipe can be supported on the rotor shaft by way of two bearings, wherein a first bearing can be provided in the region of that end of the rotor shaft which faces the rotor hub, and a second bearing in the region of that end of the rotor shaft which is turned away from the rotor hub. In a particularly advantageous way, the first bearing may then be the bearing provided on the casing. Thus, no supplementary first bearing is required in this case.

According to a second aspect of the present invention, the objective is resolved by an at least partially hollow rotor shaft for a wind energy plant, comprising a line pipe, extending in the interior of the rotating rotor shaft and being stationary and accommodating electric lines, a transmission device, arranged at least partially in the rotor shaft, for the electric connection between a stationary nacelle and a rotating rotor of the wind energy plant, wherein the transmission device features a first body, stationary and connected to the line pipe, and a second body rotating with the rotor shaft, and wherein there is an electric sliding contact between the first and the second body, and connection means formed in one piece with the second body, which are connected to the rotor shaft and/or adapted to be connected with a rotor hub of the wind energy plant, and which rotate with the rotor shaft.

Regarding the function of the rotor shaft according to the second aspect of the present invention, and in particular the advantages accompanying the same, what was said above to the first aspect of the present invention holds also in a large extent. According to the second aspect of the present invention, however, the rotating second body of the transmission device disposes of means for direct fastening on the rotor shaft itself. Through this, the inertial forces of the transmission device are dissipated directly into the rotor shaft. At the same time, the connection means take over the function of a torque bracket, so that no additional torque transmitting connection between the rotor shaft and the second body is necessary. Even a bearing for the line pipe on the rotor shaft is no more required. The rotor shaft according to the second aspect of the present invention is thus distinguished by a small number of components, and through this by a simplified construction. Furthermore, it is adapted to be installed in a simple way and it offers good maintenance possibilities.

According to one embodiment of the second aspect of the present invention, the connection means can be fixed on a flange of the rotor shaft, which is provided for the fastening of the rotor shaft on the rotor hub. This facilitates the installation. In the same way, the connection means may feature a flange for the fastening on the rotor shaft and/or on the rotor hub themselves.

The connection means can feature a line bushing for introducing electric lines into the rotor hub. In order to achieve optimised protection of the transmission device against incrustation and/or damage, the connection means can form a covering of the transmission device with respect to the inner space of the rotor hub. In order to permit a simple maintenance in doing so, it can be provided that the connection means can be opened in the region of the covering.

In the rotor shafts of the present invention, the sliding contact between the first and the second body can be a slip ring contact. Through this, the transmission device forms a slip ring system with a stationary inner ring and an outer ring, rotating around the inner ring and being in gliding contact with the outer ring. Such slip ring contacts are distinguished by high reliability and small maintenance cost.

In principle, the transmission device can be completely arranged in the rotor shaft. In this way, there is much space provided in the inner space of the rotor hub, for instance for works by servicing operators. However, it is also conceivable to arrange the transmission device only partially in the rotor shaft, in particular so far that sufficient space is provided for operators in the inner space of the rotor hub. In this way, the space required for the transmission device in the rotor shaft can be diminished, through which the stability and stiffness of the rotor shaft is increased. In addition, this facilitates the installation.

By way of the electric connection provided by the transmission device, electric energy (electric power) and/or electric control signals can be transmitted via the electric connection in particular. The connection between the line pipe and the first body of the transmission device can take place directly or indirectly in principle, for instance via a coupling.

Besides to this, the objective is resolved by a wind energy plant with a rotor shaft of the present invention.

The present invention enhances the safety and ergonomics for service operators working in the rotor hub. In addition, installation of the transmission device already in the factory before the build-up of the plant is made possible. Through this, risks through the transportation and the build-up of the plant on the location of the plant are minimised. At the same time, the labour cost when starting the operation of the wind energy plant for the first time is minimised by the simplified installation of the rotor shaft. Even the constructional expenditure for providing access to the inner space of the rotor hub is decreased.

BRIEF DESCRIPTION OF THE SEVERAL VIEWS OF THE DRAWINGS

An example of the execution of the present invention is explained in more detail by means of a drawing in the following. Schematically shown is in FIG. 1 a rotor shaft of the present invention in a cross section according to a first example of execution, FIG. 2 a rotor shaft of the present invention in a cross section according to a second example of execution.

DETAILED DESCRIPTION OF THE INVENTION

Figure 1:
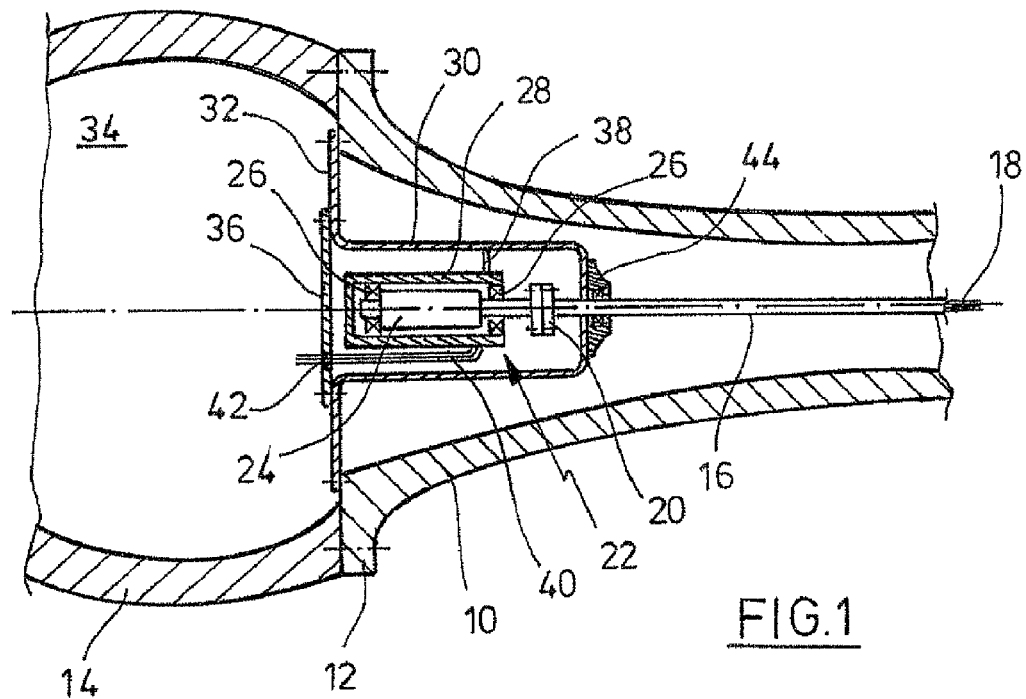

While this invention may be embodied in many different forms, there are described in detail herein a specific preferred embodiment of the invention. This description is an exemplification of the principles of the invention and is not intended to limit the invention to the particular embodiment illustrated As far as not stated otherwise, equal reference signs designate equal objects in the figures. In FIG. 1 is shown a rotor shaft 10 of a wind energy plant not depicted in more detail, formed predominantly hollow according to the first aspect of the present invention. The rotor shaft 10 features a flange 12, by way of which it is fastened on a rotor hub 14 of the plant. In the interior of the rotor shaft 10 which rotates with the rotor hub 14 coaxially extends a stationary line pipe 16 (pitch pipe). The line pipe 16 guides electric lines 18 from the stationary nacelle (not depicted) of the wind energy plant in the direction of that end of the rotor shaft 10 which faces the rotor hub 14. Via an also stationary coupling 20, the line pipe 16 is connected with a transmission device 22, completely arranged within the rotor shaft 10, for the electric connection between the stationary nacelle and the rotating rotor.

The transmission device 22 has a first stationary body 24, which is connected to the line pipe 16 by way of the coupling 20. A second body 28 of the transmission device is mounted rotatably with respect to the first body 24 by way of two bearings 26. There is an electric sliding contact between the first body 24 and the second body 28. The first and the second body 24, 28 form a slip ring system in this, wherein the first body 24 forms a stationary inner ring, and the second body 28 a rotating outer ring. Furthermore, a casing 30 formed separately from the second body 28 is provided, which completely surrounds the transmission device 22. The casing 30 is also completely arranged within the rotor shaft 10. The casing 30 has a flange 32, by which it is fastened on the flange 12 of the rotor shaft 10. Thus, it rotates together with the rotor shaft 10 and the rotor hub 14. The casing 30 has furthermore a covering 36, facing the inner space 34 of rotor hub 14 in the form of a cover-up plate 36. The covering 36 is detachably fastened on the casing 30. In this way, the casing 30 can be opened, for instance for the maintenance of the transmission device 22. At the same time, the transmission device 22 is safely protected against damage or incrustation in the closed condition of the casing 30.

Between the casing 30, 36 and the second body 28 of the transmission device, there is a torque transmitting connection 38. This torque bracket 28 makes sure that even the second body 28 of the transmission device 22 rotates along in a rotation of the rotor hub 14 and the rotor shaft 10, and through this of the casing 30. In doing so, electric signals and/or electric energy guided into the stationary first body 24 of the transmission device 22 by the lines 18 are transmitted to the rotating second body 28 by way of the sliding contact. These signals and/or electric energy are introduced into the inner space of the rotor hub 34 through a line bushing 42 of the casing 30 by way of electric lines 40. From there, the lines 40 can be guided to a blade pitch control device of the wind energy plant, for instance. On its end turned away from the inner space of the rotor hub 34, the casing 30 has a bearing 44, by way of which the casing 30 is bearing mounted with respect to the line pipe 16.

The rotor shaft shown in FIG. 1 offers maximum space for service operators in the inner space 34 of the hub 14. At the same time, the transmission device 22 is optimally protected by the casing 30. By the detachable covering 36, the transmission device 22 can be serviced in a simple way. Due to the integration of the transmission device 22, including the casing 30, into the rotor shaft 10, the transmission device 22 can be installed in the rotor shaft 10 already in the factory, before the plant is built up on its respective location.

Figure 2:
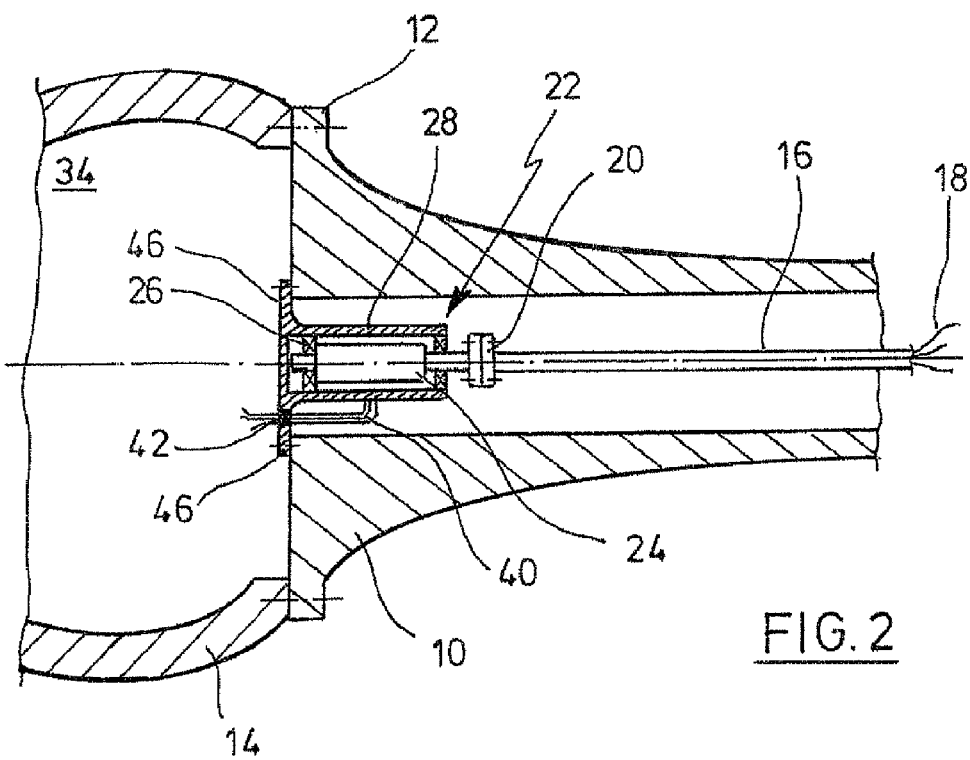

In FIG. 2, a rotor shaft 10 according to the second aspect of the present invention is depicted. To a large extent, the construction of this rotor shaft 10 corresponds to the construction of the rotor shaft 10 according to the first aspect of the present invention depicted in FIG. 1. However, the rotor shaft 10 according to the second aspect differs with respect to its transmission device 22 for the electric connection between the stationary nacelle and the rotating rotor of the wind energy plant. For instance, the transmission device 22 according to the second aspect of the present invention has no separate casing that surrounds the transmission device 22. Instead, connection means 46 formed in one piece with the second body 28 are provided in the form of a flange 46. The flange is formed on that end of the second body 28 which faces the inner space 34 of the rotor hub. The flange 46 is in turn fastened on the flange 12 of the rotor shaft 10. Due to this fastening, it is made sure that the second body 28 rotates together with the rotor hub 14 and the rotor shaft 10.

The rotor shaft 10 according to the second aspect of the present invention is distinguished by a simplified construction, and an installation that is simplified through this. At the same time, the flange 46 of the second body 28 forms a covering of the transmission device 22 with respect to the inner space 34 of the rotor hub 14. The inertial forces of the transmission device 22 are guided directly into the rotor shaft 10. In addition, the flange 46 takes over the function of the torque bracket 38 at the rotor shaft 10 according to the first aspect of the present invention, which can thus be omitted. Even the bearing 44 of the line pipe 16 on the rotor shaft 10 can be omitted on the shaft 10 according to the second aspect of the present invention.

Of course, the transmission devices 22 according to the present invention can also be arranged in the interior of the rotor shaft 10 only partly. Also, it would be conceivable to connect the casing 30 in the rotor shaft 10 according to the first aspect of the invention, or the connection means 46 in the rotor shaft 10 according to the second aspect of the invention, respectively, with the rotor hub 14 in addition or alternatively.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed:

1. A rotor shaft for a wind energy plant, wherein the rotor shaft is at least partially hollow, comprising a line pipe (16), extending in the interior of the rotating rotor shaft (10) and being stationary and accommodating electric lines (18), a transmission device (22), arranged at least partially in the rotor shaft (10), for the electric connection between a stationary nacelle and a rotating rotor of the wind energy plant, wherein the transmission device (22) features a first body (24), stationary and connected to the line pipe (16), and a second body (28) rotating with the rotor shaft (10), and wherein there is an electric sliding contact between the first and the second body (24, 28), a casing (30, 36) surrounding the transmission device (22) and formed separately from the second body (28), which is connected to the rotor shaft (10) and/or adapted to be connected to a rotor hub (14) of the wind energy plant, and which rotates with the rotor shaft (10), and a torque transmitting connection (38) between the casing (30, 36) and the second body (28) of the transmission device (22).

2. A rotor shaft according to claim 1, characterised in that the rotor shaft (10) is predominantly formed hollow in the region of its connection to the rotor hub (14) of the wind energy plant.

3. A rotor shaft according to claim 1, characterised in that the casing (30, 36) is fixed on a flange (12) of the rotor shaft (10), which is provided for the fastening of the rotor shaft (10) on the rotor hub (14).

4. A rotor shaft according to claim 1, characterised in that the casing (30, 36) features a flange (32) for the fastening on the rotor shaft (10) and/or the rotor hub (14).

5. A rotor shaft according to claim 1, characterised in that the casing (30, 36) features a line bushing (42) for introducing electric lines (40) into the rotor hub (14).

6. A rotor shaft according to claim 1, characterised in that the casing (30, 36) features a detachable covering (36), facing the inner space of the rotor hub (14) of the wind energy plant.

7. A rotor shaft according to claim 1, characterised in that a bearing (44) is provided on the casing (30, 36), by way of which the casing (30, 36) is mounted rotatably with respect to the line pipe (16).

8. A rotor shaft according to claim 7, characterised in that the line pipe (16) is supported in the rotor shaft (10) by way of two bearings, wherein a first bearing (44) is provided in the region of that end of the rotor shaft (10) which faces the rotor hub (14), and a second bearing in the region of that end of the rotor shaft (10) which is turned away from the rotor hub (14), and wherein the first bearing is the bearing (44) provided on the casing (30, 36).

9. A rotor shaft (10) according to claim 1, in combination with a wind energy plant.

10. A rotor shaft for a wind energy plant, wherein the rotor shaft is at least partially hollow, comprising a line pipe (16), extending in the interior of the rotating rotor shaft (10) and being stationary and accommodating electric lines (18), a transmission device (22), arranged at least partially in the rotor shaft (10), for the electric connection between a stationary nacelle and a rotating rotor of the wind energy plant, wherein the transmission device (22) features a first body (24), stationary and connected to the line pipe (16), and a second body (28) rotating with the rotor shaft (10), and wherein there is an electric sliding contact between the first and the second body (24, 28), connection means (46) formed in one piece with the second body (28), which are connected to the rotor shaft (10) and/or adapted to be connected with a rotor hub (14) of the wind energy plant, and which rotate with the rotor shaft (10).

11. A rotor shaft according to claim 10, characterised in that the connection means (46) are fixed on a flange (12) of the rotor shaft (10), which is provided for the fastening of the rotor shaft (10) on the rotor hub (14).

12. A rotor shaft according to claim 10, characterised in that the connection means (46) feature a flange (46) for the fastening on the rotor shaft (10) and/or the rotor hub (14).

13. A rotor shaft according to claim 10, characterised in that the connection means (46) feature a line bushing (42) for introducing electric lines (40) into the rotor hub (14).

14. A rotor shaft according to claim 10, characterised in that the connection means (46) form a covering of the transmission device (22) with respect to the inner space (34) of the rotor hub (14).

15. A rotor shaft according to claim 14, characterised in that the connection means (46) can be opened in the region of the covering.

16. A rotor shaft according to claim 10, characterised in that the sliding contact between the first and the second body (42, 28) is a slip ring contact.

17. A rotor shaft according to claim 10, characterised in that the transmission device (22) is arranged completely in the rotor shaft (10).

18. A rotor shaft according to claim 10, characterised in that electric energy and/or electric control signals can be transmitted via the electric connection.

* * * * *